United States Patent [19]
Reynolds

[11] Patent Number: 5,742,499
[45] Date of Patent: Apr. 21, 1998

[54] METHOD AND SYSTEM FOR DYNAMICALLY SELECTING A COMMUNICATION MODE

[75] Inventor: David Corder Reynolds, Kingston, N.Y.

[73] Assignee: International Business Machines Corporation, Armonk, N.Y.

[21] Appl. No.: 681,200

[22] Filed: Jul. 22, 1996

Related U.S. Application Data

[63] Continuation of Ser. No. 223,339, Apr. 5, 1994, abandoned.
[51] Int. Cl.$^6$ .................. G06F 13/372; G06F 13/374
[52] U.S. Cl. .................. 364/131; 395/200.834; 340/517; 340/825.06
[58] Field of Search .................. 364/131, 132; 395/200, 200.1, 200.11, 200.14, 824, 827, 831, 834; 340/509, 517, 825.06; 370/58.2, 58.3, 60, 60.1

[56] References Cited

U.S. PATENT DOCUMENTS

| | | | |
|---|---|---|---|
| 4,247,892 | 1/1981 | Lawrence | 364/200 |
| 4,750,116 | 6/1988 | Pham et al. | 364/200 |
| 4,766,534 | 8/1988 | DeBenedictis | 395/200.14 |
| 5,101,498 | 3/1992 | Ehlig et al. | 395/800 |
| 5,218,676 | 6/1993 | Ben-Ayed et al. | 395/200 |
| 5,349,649 | 9/1994 | Iijima | 395/831 X |
| 5,349,679 | 9/1994 | Nakayama | 395/800 |
| 5,367,636 | 11/1994 | Colley et al. | 395/200 |
| 5,426,674 | 6/1995 | Nemirovsky et al. | 395/200.1 |

FOREIGN PATENT DOCUMENTS 0463252  1/1992  European Pat. Off. .
0506135  9/1992  European Pat. Off. .

OTHER PUBLICATIONS

Joseph M. Perl et al., "An Autonomous Communication Controller", Proceedings International Computer Science Conference 188—Artificial Intelligence: Theory and Applications, Hong Kong, 19–21 Dec. 1988, 1988 Hong Kong, IEEE Comput. Soc. Hong Kong Chapter pp. 611–616.

"Flow Control Support For Efficient Realization of the EDA Model", H. Wu et al., Microprocessing and Microprogramming, vol. 34, No. 1, Feb. 1,1992, pp. 175–178.

Patent Abstracts of Japan, vol. 013, No. 207 (E–758), May 16, 1989 "Mixed Mode Communication Terminal Equipment".

"Artificial Intelligence: Theory and Applications", Proceedings International Computer Science Conference '88, pp. 611–616.

Primary Examiner—Reba I. Elmore
Assistant Examiner—Marc A. Wsol
Attorney, Agent, or Firm—Floyd A. Gonzalez; Heslin & Rothenberg

[57] ABSTRACT

In a multi-processor parallel processing computer environment different communication modes are available for performing an information distribution operation (e.g., a broadcast) between processors. The technique comprises automatically selecting an optimal communications mode at operation run-time. The selection decision utilizes hardware parameters of the system (e.g., communication speed between processors) and run-time parameters (e.g., number of nodes to broadcast a message to). The communication mode selection decision seeks to optimize factors such as time required to execute or work space requirements of the distribution operation.

4 Claims, 3 Drawing Sheets

METHOD AND SYSTEM FOR DYNAMICALLY SELECTING A COMMUNICATION MODE

This application is a continuation of application Ser. No. 08/223,339, filed Apr. 5, 1994, now abandoned.

TECHNICAL FIELD

This invention relates in general to the selection of software resources within an information processing system, and more particularly, to the dynamic selection of a communication mode (for performing a particular operation) from a number of available communication modes for that operation.

BACKGROUND ART

In the information processing environment, systems are programmed using many techniques. Techniques are chosen for specific tasks based upon their characteristics. Usually, no one technique performs best in all situations. In the past there has been no way to dynamically choose the best technique while a program is running, so a compromise technique has always been used. Thus, a sacrifice in system performance often results depending upon the program being executed.

One particular situation where this problem arises is in multiple processor systems, and in particular, in a parallel processing system. In such a system, each processor has means to communicate with the other processors and various protocols and modes exist to perform a communication. Since the range of tasks that a parallel processing system may handle varies greatly, the messaging structure could be optimized for various different situations. Unfortunately, when the operating software for a parallel processing system is designed, it is difficult to know the exact applications that will run on the system. Therefore, it is difficult to predict what type of communication mode between nodes of the processing system would be optimal.

For example, one use of inter-processor communications is in the "broadcasting" of messages from one node to many other nodes of the multinode computer system. Depending upon such factors as the length of the message, speed of the communication means between nodes, number of nodes for the message to be sent to, and the mode used to distribute the message, the time interval required to distribute the message among nodes may vary greatly.

One implementation of a parallel processing system is the IBM SP1 (Scalable Power Parallel Systems 9076-SP1). In this system, there exist three primitives for communication between nodes. These primitives include send, receive, and send/receive. A Collective Communications Library (CCL) manages complex inter-processing node communications. The CCL is called by an application program, and the CCL thereafter calls the appropriate primitive(s) to effectuate inter-processing node communications. In the SP1 implementation, only a single mode is used to distribute messages, i.e., an all-to-all communication mode. This mode was chosen for its overall good performance under varied conditions. There are many circumstances however, where other modes would have been a better choice. For example, a hypercube communication mode is faster than the all-to-all mode when messages to be broadcast are short.

Varying modes of communication can be optimal for differing combinations of parameters, such as the number of nodes, the time required to transmit a message, and the overall message length. Thus, the problem that exists with a computer system wherein the mode of communication is fixed, is that the mode is typically not optimal for each application program to run on the computer system.

Thus, a further problem not addressed by the prior art is how to automatically select an optimal communication mode for the type of application program currently being run. It would be advantageous if means were provided for dynamically determining various parameters that may influence the performance of a communication mode. Also, additional means could be provided for the application to specify the performance characteristic to be optimized, such as distribution time, execution speed, or the effect on computer system traffic (which includes traffic on the network fabric connecting the processors). Further, it would be advantageous if the parameters governing communication mode selection were updated and optimized as the system ran and not merely fixed at the start of an application program.

Also, it would be beneficial if the communication mode selection process was transparent to the application program. More specifically, if the application program issued a command to broadcast a message to all nodes, the application program should only have to issue a single command. This command would cause all mode selection decisions to be made by the computer system. With such a system, the application programmer would not have to be concerned with communication mode selection because the selection is dynamically performed by the system. The application code would be easier to read because only a single command is needed to dynamically select and execute an operation. Additionally, message handling would be more efficient because the library programmer has a better overall knowledge of the system than the application programmer. The invention described herein addresses all of the above-described objects and contains all of the described advantages.

SUMMARY OF THE INVENTION

Briefly described, in accordance with a first aspect of the invention, a method is provided for dynamically selecting one of a plurality of communication modes for performing a particular operation. The method includes obtaining a run-time parameter associated with the particular operation; and selecting one communication mode from the plurality of communication modes using the associated run-time parameter. More specifically, the selecting step can include employing a predefined decision function to select the one communication mode, and obtaining a hardware parameter of the computer system for use in selecting the one communication mode. Further, the one communication mode is preferably selected using the associated run-time parameter so as to optimize a performance characteristic of the computer system.

In another aspect, the invention comprises a method for performing a particular operation employing a selected communication mode within a multinode computer system. This method includes selecting a mode of communication from a plurality of modes of communication for performing the particular operation so as to optimize a performance characteristic of the multinode computer system; and performing the particular operation within the multinode computer system using the selected mode of communication.

In still another aspect, the invention comprises a multinode computer system for performing a particular operation. The system includes processing means for obtaining a run-time parameter associated with the particular operation and for selecting one communication mode from a plurality of communication modes using the associated run-time parameter.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
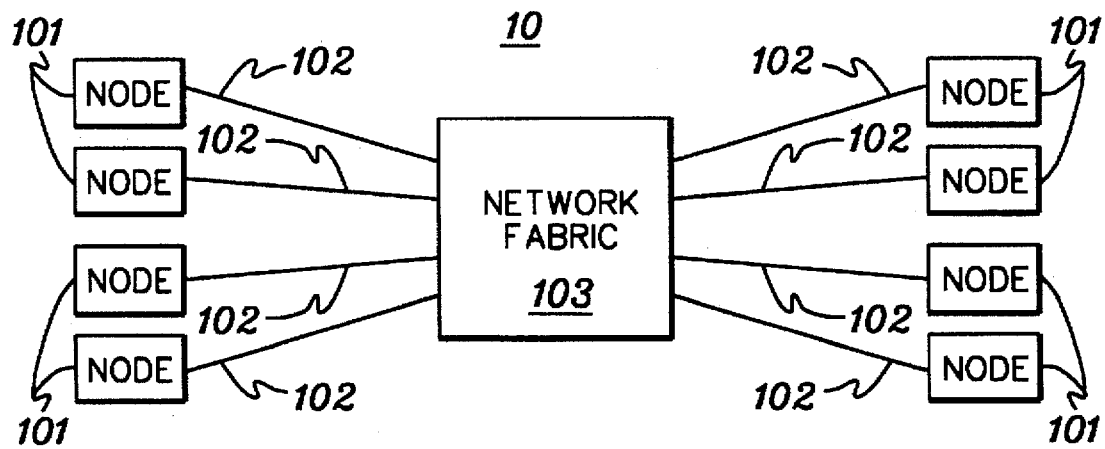
FIG. 1 is a simplified block diagram of a multinode computer system.

FIG. 1 illustrates a typical loosely coupled parallel processing system, generally denoted 10. The parallel processing system comprises a plurality of processors 101, a plurality of network connections 102, and a network fabric 103. Processors 101 are attached to network fabric 103 by network connections 102. Each processor 101 is capable of communicating with each other processor 101 through the network fabric 103. Processor 101 is sometimes referred to herein as a node.

As recited herein, the term "multinode" computer system refers to a computer system comprised of a plurality of processors, such as the above-referenced IBM SP1 parallel processing system. Also, as used herein, the term "communication mode" refers to the method by which transfer of information is performed between the nodes. Examples include an "all-to-all" and a "hypercube" communication mode.

An application program will request the computer system to perform a plurality of "operations". Each particular operation requires communication among the nodes of the parallel processing system. Thus, each operation requires the use of a communication mode. An example of such an operation would be a "broadcast". The broadcast operation requires the distribution of a "message" to a plurality of nodes. Another example of an operation would be a "scatter". The scatter operation distributes a message only to a certain "number of nodes" in the system. Other examples are presented in Table 1.

TABLE 1

| Collective Communications Subroutines | | |
|---|---|---|
| FORTRAN | C | DESCRIPTION |
| MP_BCAST | mpc_bcast | Sends a message from one task to all tasks in the group. |
| MP_REDUCE | mpc_reduce | Applies a reduction operation on all the tasks in the group and places the result in one task. The reduction operations include addition, multiplication, maximum, minimum, bitwise-AND, bitwise-OR, bitwise-XOR, Boolean-AND and Boolean-OR and operations you define yourself. |
| MP_COMBINE | mpc_combine | Applies a reduction operation and places the result in all tasks in the group. This is operationally equivalent to a reduce followed by bcast. |
| MP_SCATTER | mpc_scatter | Distributes distinct messages from a single source task to each task in the group. This type of operation is also known as one-to-all personalized communication or distribute. |
| MP_GATHER | mpc_gather | Gathers distinct messages from each task in the group to a single destination task. It is also called collect and is the reverse operation of scatter. |
| MP_SYNC | mpc_sync | Creates a barrier synchronization in the group. Each task when reaching the sync call, blocks until all tasks in the group reach the corresponding sync call. |
| MP_SHIFT | mpc_shift | Shifts data, with or without wraparound, up or down some number of steps in the group. |
| MP_PREFIX | mpc_prefix | Applies parallel prefix with respect to a reduction operation across a task group and places the corresponding result in each task in the group. This operation is also called scan. |
| MP_CONCAT | mpc_concat | Concatenation (to all tasks) in the group. It is logically equivalent to each task in the group performing a one-to-all broadcast. It is also referred to as completed broadcast or expand. |
| MP_INDEX | mpc_index | Each task in a group performs a scatter operation sending a distinct message to all the tasks in the group in order by rank. It is |

TABLE 1-continued

Collective Communications Subroutines

| FORTRAN | C | DESCRIPTION |
|---|---|---|
| | | also called multi-scatter, all-to-all personalized communication, or complete exchange. |

A "decision function" is used to select the communication mode for performing a particular distribution operation. The decision function uses one or more "parameters" to select the communication mode. One type of parameter is a "run-time" parameter which is associated with the particular operation. An example of a run-time parameter associated with a broadcast operation would be the message to be broadcast.

Another type of parameter is a "hardware parameter". An example of a hardware parameter would be "execution speed" of the processor. Another example would be the "memory move" speed of the processor. This is the speed at which the processor can move values from one location in its memory to another. Memory move speed is a useful metric because certain communication modes require the manipulation of large amounts of data in the processor's memory. In one simple embodiment, the hardware parameters could be obtained at the beginning of the job.

Both types of parameters are used by the decision function in conjunction with certain "predefined relationships", which are incorporated in the computer system's library when developed. Run-time and hardware parameters are employed in defining the relationships. Each particular operation using each communication mode is described by one of the relationships. Examples of "relationships" include the "time interval required for executing," "computer system traffic generated by," and "work space required for performing" the particular operation using each communication mode.

The relationships are "prioritized" by a library developer to represent some preference in selecting a communication mode. This preference may be to minimize (i.e., optimize) time or work space required for the execution of the operation. The operation is typically executed within a "job" on a computer system. The job may, however, include multiple operations that require the dynamic selection process.

Figure 2:
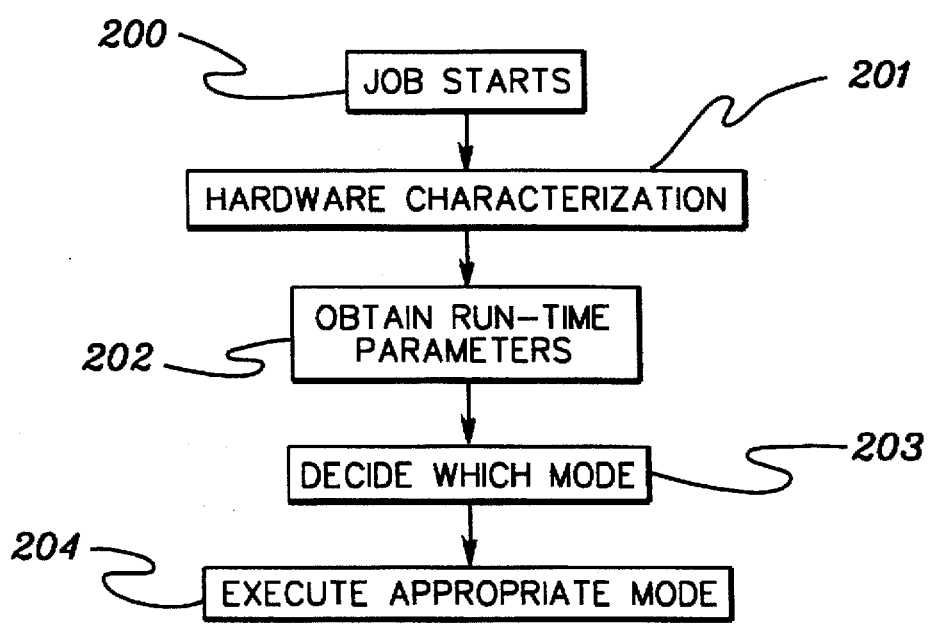
FIG. 2 is a simplified flowchart of one embodiment of a process for selecting a communication mode in accordance with the present invention.

FIG. 2 is a flowchart illustrating one embodiment of the overall process for selecting a technique for a particular task. Initially, a job is started, 200, "JOB STARTS," that requires the use of an operation that may be performed by a plurality of communication modes. A hardware characterization test is then run, 201, "HARDWARE CHARACTERIZATION." This test provides a plurality of hardware parameters that will be used within the decision function that determines which communication mode will be selected. Next, a set of run-time parameters are obtained that will be used in the decision function, 202, "OBTAIN RUN-TIME PARAMETERS." These parameters may include, for example, a message to be broadcast to a plurality of nodes, or a quantity of nodes for a message to be broadcast to. The decision function, 203, "DECIDE WHICH MODE," uses the run-time and hardware parameters to decide which communication mode to select. The selected communication mode is then employed, 204, "EXECUTE APPROPRIATE MODE." In another embodiment, the job may include a plurality of identical or different type operations, each requiring the dynamic selection of a communication mode.

Figure 3:
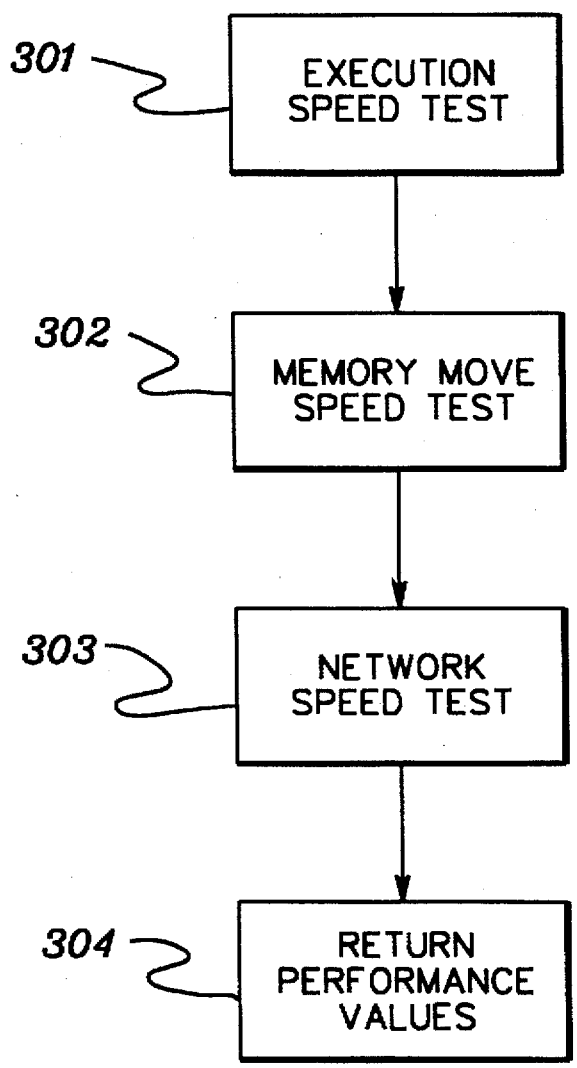
FIG. 3 is a flowchart of one embodiment of a hardware characterization process for the selection process of FIG. 2.

As noted briefly above, the dynamic communication mode selection process in accordance with the present invention is based upon many parameters. These parameters are derived from a plurality of sources. A first source of parameters are hardware parameters of the multinode computer system. For example, in one embodiment, a hardware characterization test is preferably run at the beginning of a job to obtain hardware performance characteristics such as processor execution speed, memory move speed, and network interconnect speed. A flowchart of one embodiment of a hardware characterization process is presented in FIG. 3. This process includes a plurality of tests used to characterize the hardware and obtain hardware parameters.

First, an execution speed test is run, 301, "EXECUTION SPEED TEST." In this test, the processor executes a series of instructions while the elapsed time is recorded. Next, an array of values is copied within the processor's memory, 302, "MEMORY MOVE SPEED TEST." The elapsed time is again recorded. The time it takes a series of messages to pass between nodes is recorded in a network speed test, 383, "NETWORK SPEED TEST." The results of the aforementioned tests are returned, 304, "RETURN PERFORMANCE VALUES," for inclusion in the decision function. In another embodiment of this invention, other tests used to characterize the hardware may be added such as a floating point math performance test. The method for carrying out these and other hardware characterization tests would be obvious to one of ordinary skill in the art.

In a further embodiment, the hardware characterization test may be run on a periodic basis during execution of the job so that the hardware parameters used by the decision function are always representative of the current system. For example, if a job starts at a time when the network is lightly loaded, the hardware parameter associated with computer system traffic would indicate a low traffic level and thus, a fast network connection between processors. At sometime later, however, the computer system traffic may increase resulting in the network becoming congested and, thus, a slower network connectivity. Updating the computer system traffic parameter would allow the selection decision to be more accurate in this instance. Updating may occur every time a decision is to be made, every ten times a decision is to be made, or on any other periodic or non-periodic basis. It is important to note that it would be imprudent to run the hardware characterization test very often because the time taken by the test may use an excessive amount of computer time, thereby degrading overall system performance.

In a further embodiment, the hardware parameter updating may be done dynamically with distribution of each message. For example, a short, 2 or 3 byte, time stamp could be placed at the end of each message greater than a certain length. The length of the message would be chosen so that the additional bytes used by the time stamp do not significantly increase the overall length of the message. In one embodiment, a time stamp may be added to each message greater than 1000 bytes in length. Use of a time stamp enables calculation of the time interval required for the associated message to traverse the network. The calculated time interval may then be used to determine the speed of the network, and to update the computer system traffic parameter.

The second source of parameters used in the decision function is information provided by the application program, for example, contained in a request for a particular operation received from the application program running on a processing node. In the case of a scatter operation, examples include the length of the message (to be distributed), and the number of processing nodes to which the message is to be distributed. Relevant parameters for operations currently known, or those yet to be written, would be obvious to one of ordinary skill in the art.

Various characteristics of each communication mode for each operation are described by a predefined relationship or formula. The predefined relationship is defined by the aforementioned run-time and hardware parameters and represents quantities such as the time interval an operation requires to execute, the work space requirements of an operation, and the computer system traffic caused by the operation.

Two examples of communication modes for a broadcast operation are the all-to-all mode and the hypercube mode. The time intervals required by a broadcast operation implemented using the all-to-all and hypercube modes may be easily computed, in addition to other characteristics of these two communication modes. Formulas for calculating time, computer system traffic, and work space requirements are set forth below for both the all-to-all and hypercube modes.

The variables common to the formulas are:

N=Number of nodes;

L=Latency—time required to initiate a transmission;

x=Time required to transmit one byte of data;

m=Message length;

T=Time required to complete the mode;

W=Work space requirements; and

S=Computer system traffic.

The time required to complete a communication mode can be expressed:

For hypercube mode broadcast as:

$$T = [\log_2 N](L+mx)$$

For all-to-all mode broadcast as:

$$T = 3(N-1)\left(L + \frac{m}{N} x\right)$$

The computation of work space requirements for a communication mode can be expressed:

For hypercube mode broadcast as:

$$W=0$$

For all-to-all mode broadcast as:

$$W=0$$

(Note: Neither of these modes require any work space, others may.)

The computation of computer system traffic for a communication mode can be expressed:

For hypercube mode broadcast as:

$$m(N-1)$$

For all-to-all mode broadcast as:

$$m \log_2 N + m(N-1)$$

The computation of these parameters (and others) for additional broadcast modes will be straightforward for one skilled in the art.

Figure 4:
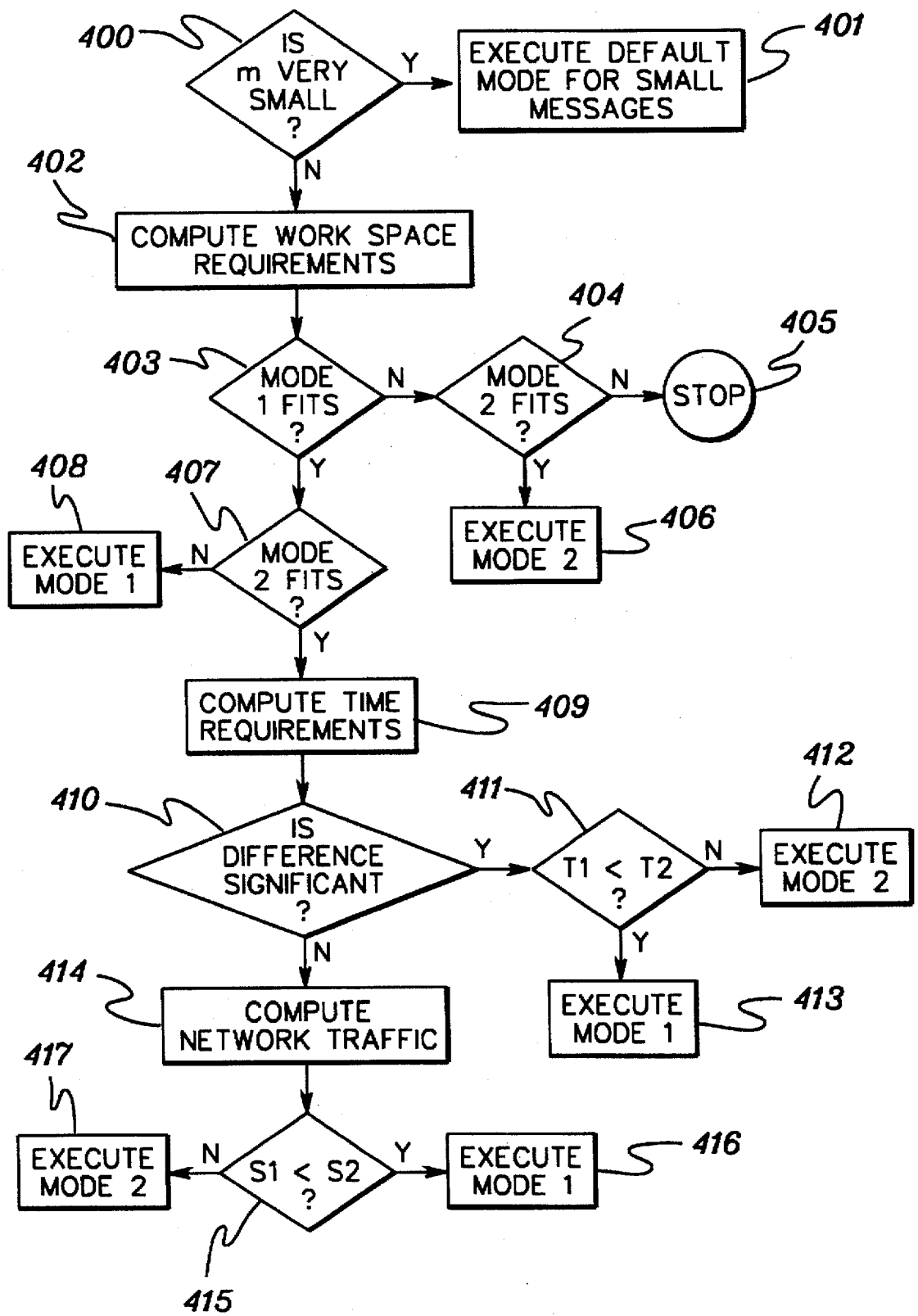
FIG. 4 is a flowchart of one embodiment of a decision making process for the selection process of FIG. 2.

By way of example, a flowchart of one embodiment of a decision function for selecting which communication mode will be used for a broadcast operation is presented in FIG. 4. First, a decision is made as to whether the length (m) of the message to be broadcast is very small, 400, "IS m VERY SMALL?" If "yes," then a mode that is known to work well for a broadcast operation of very small messages is chosen, 401, "EXECUTE DEFAULT MODE FOR SMALL MESSAGES." If desired, the preliminary steps 400 and 401 could be excluded from the decision function.

Assuming that the message is not very small, the work space requirements for each communication mode are established, 402 "COMPUTE WORK SPACE REQUIREMENTS." In this example there are two possible modes, mode 1 and mode 2. A decision is initially made, 403, "MODE 1 FITS?", whether mode 1 will fit into memory. If it will not, then inquiry is made whether mode 2 will fit in memory, 404, "MODE 2 FITS?". If neither mode will fit, then the process is stopped, 405, "STOP." Alternatively, if mode 2 fits in memory, then it is executed, 406, "EXECUTE MODE 2." Again, this assumes that mode 1 did not fit in memory. If mode 1 did fit in memory then inquiry is made whether mode 2 also fits in memory, 407, "MODE 2 FITS?". If mode 2 does not fit in memory, then mode 1 is executed, 408, "EXECUTE MODE 1." This is because mode 1 is the only viable choice.

If both mode 1 and mode 2 fit into memory, then the time requirements for each mode are computed, 409, "COMPUTE TIME REQUIREMENTS." Inquiry is made regarding whether there is a significant difference, between the times required for executing the two modes, 410, "IS DIFFERENCE SIGNIFICANT?" A significant difference in time might be a difference greater than five (5) percent. If the difference is significant, then a decision is made whether the time taken by mode 1 (T1) is less than the time taken by mode 2 (T2), 411, "T1<T2?". If time T1 is not less than time T2, then mode 2 is executed, 412, "EXECUTE MODE 2." However, if time T1 is less than time T2, then mode 1 is executed, 413, "EXECUTE MODE 1." Essentially, the object here is to minimize the time needed to perform the broadcast.

If there is no significant difference between the time each mode requires, then a comparison based upon the next most important factor, e.g., computer system traffic, is made. First, the computer system traffic for the two modes is calculated, 414, "COMPUTE NETWORK TRAFFIC." Then, inquiry is made as to whether the network traffic of mode 1 (S1) is less than the network traffic of mode 2 (S2), 415, "S1<S2?". If the computer system traffic generated by mode 1 is less, then mode 1 is chosen, 416, "EXECUTE MODE 1," thus minimizing computer system traffic. Alternatively, if the network traffic caused by mode 1 is greater than that of mode 2, then mode 2 is executed, 417, "EXECUTE MODE 2," again minimizing computer system traffic.

Note from the above discussion, that a preliminary step preferably precedes the full decision function. In this preliminary step (steps 400 and 401), a 'quick' inquiry is made into whether the complete decision function needs to be executed. If the complete decision function is not needed, then a particular communication mode is automatically chosen, and the decision process is bypassed. For example, if a very short message is to be broadcast, then the time spent in the decision function may be longer than the time it takes to broadcast the message. Performing the complete decision function in such a case would be wasteful. Therefore, default communication mode with good short message performance is automatically chosen.

As a specific hardware embodiment of the invention, the multiple processors could comprise IBM RS/6000 processors, and the network fabric linking the processors could consist of a crossbar switch. In another embodiment, the network fabric might be a local area network, and the processors could comprise IBM PS/2 processors. One skilled in the art will recognize that processor types and network fabric types may vary greatly, and may even be mixed within the same system without departing from the scope of the present invention.

While the invention has been particularly shown and described with reference to a preferred selection method and apparatus embodiment therein, it will be understood by those skilled in the art that various other changes in form and detail may be made without departing from the spirit and scope of the invention. The claims appended hereto are intended to encompass all such modifications.

What is claimed is:

1. In a computer system having multiple nodes, a method for dynamically selecting one communication mode from a plurality of communication modes for distributing information from an originating node of said multiple nodes to a predetermined number of other nodes of said multiple nodes, said method comprising the steps of:

(a) obtaining a run-time user parameter associated with said distributing information;

(b) obtaining a run-time hardware parameter comprising a dynamic characteristic of the computer system;

(c) selecting one communication mode from the plurality of communication modes using said associated run-time user parameter and said run-time hardware parameter so as to optimize performance of the computer system, said one communication mode determining how the information is to be distributed from the originating node of said multiple nodes to the predetermined number of other nodes of the multiple nodes, wherein said selecting includes employing said run-time user parameter and said run-time hardware parameter in a predefined decision function to select said one communication mode from said plurality of communication modes, said predefined decision function employing a plurality of predefined relationships, wherein at least some predefined relationships of said plurality of predefined relationships comprise system use relationships which project for each communication mode an anticipated resource loading within the computer system for distribution of said information using said communication mode, said selecting including employing said projections of said at least some predefined relationships within said predefined decision function to select said one communication mode from said plurality of communication modes to minimize said anticipated resource loading within the computer system due to distribution of said information from said originating node to said predetermined number of other nodes of said multiple nodes; and (d) distributing said information from the originating node of said multiple nodes to the predetermined number of other nodes of said multiple nodes using said selected one communication mode; and wherein said selecting includes employing a predefined time relationship within said decision function, said predefined time relationship comprising a time interval relationship for performing the particular operation using the selected one communication mode, said selected one communication mode comprising an all-to-all mode broadcast, and wherein said predefined time relationship comprises:

$$T = 3(N-1)\left(L + \frac{m}{N} x\right)$$

wherein:

T=time required to complete mode;

N=number of nodes;

L=transmission latency;

m=message length; and x=time required to transmit one byte of data.

2. In a computer system having multiple nodes, a method for dynamically selecting one communication mode from a plurality of communication modes for distributing information from an originating node of said multiple nodes to a predetermined number of other nodes of said multiple nodes, said method comprising the steps of:

(a) obtaining a run-time user parameter associated with said distributing information;

(b) obtaining a run-time hardware parameter comprising a dynamic characteristic of the computer system;

(c) selecting one communication mode from the plurality of communication modes using said associated run-time user parameter and said run-time hardware parameter so as to optimize performance of the computer system, said one communication mode determining how the information is to be distributed from the originating node of said multiple nodes to the predetermined number of other nodes of the multiple nodes, wherein said selecting includes employing said run-time user parameter and said run-time hardware parameter in a predefined decision function to select said one communication mode from said plurality of communication modes, said predefined decision function employing a plurality of predefined relationships, wherein at least some predefined relationships of said plurality of predefined relationships comprise system use relationships which project for each communication mode an anticipated resource loading within the computer system for distribution of said information using said communication mode, said selecting including employing said projections of said at least some predefined relationships within said predefined decision function to select said one communication mode from said plurality of communication modes to minimize said anticipated resource loading within the computer system due to distribution of said information from said originating node to said predetermined number of other nodes of said multiple nodes; and (d) distributing said information from the originating node of said multiple nodes to the predetermined number of other nodes of said multiple nodes using said selected one communication mode; and wherein said anticipated resource loading comprises anticipated system traffic, and wherein said selecting includes employing a predefined traffic relationship within said decision function, said predefined traffic relationship comprising a relationship definitive of computer system traffic generated by performing the particular operation using the selected one communication mode, the selected one communication mode comprising an all-to-all mode broadcast, and wherein the predefined traffic relationship comprises:

$$m \log_2 N + m(N-1)$$

wherein:
m=message length; and
N=number of nodes.

3. In a computer system having multiple nodes, a method for dynamically selecting one communication mode from a plurality of communication modes for distributing information from an originating node of said multiple nodes to a predetermined number of other nodes of said multiple nodes, said method comprising the steps of:

(a) obtaining a run-time user parameter associated with said distributing information;

(b) obtaining a run-time hardware parameter comprising a dynamic characteristic of the computer system;

(c) selecting one communication mode from the plurality of communication modes using said associated run-time user parameter and said run-time hardware parameter so as to optimize performance of the computer system, said one communication mode determining how the information is to be distributed from the originating node of said multiple nodes to the predetermined number of other nodes of the multiple nodes, wherein said selecting includes employing said run-time user parameter and said run-time hardware parameter in a predefined decision function to select said one communication mode from said plurality of communication modes, said predefined decision function employing a plurality of predefined relationships, wherein at least some predefined relationships of said plurality of predefined relationships comprise system use relationships which protect for each communication mode an anticipated resource loading within the computer system for distribution of said information using said communication mode, said selecting including employing said projections of said at least some predefined relationships within said predefined decision function to select said one communication mode from said plurality of communication modes to minimize said anticipated resource loading within the computer system due to distribution of said information from said originating node to said predetermined number of other nodes of said multiple nodes; and (d) distributing said information from the originating node of said multiple nodes to the predetermined number of other nodes of said multiple nodes using said selected one communication mode; and wherein said selecting includes employing a predefined time relationship within said decision function, said predefined time relationship comprising a time interval relationship for performing the particular operation using the selected one communication mode, wherein the selected one communication mode comprises a hypercube mode broadcast, and wherein said time interval relationship is expressed as:

$$T = [\log_2 N](L + mx)$$

wherein:
T=time required to complete the selected mode;
N=number of nodes;
L=transmission latency;
m=message length; and
x=time required to transmit one byte of data.

4. In a computer system having multiple nodes, a method for dynamically selecting one communication mode from a plurality of communication modes for distributing information from an originating node of said multiple nodes to a predetermined number of other nodes of said multiple nodes, said method comprising the steps of:

(a) obtaining a run-time user parameter associated with said distributing information;

(b) obtaining a run-time hardware parameter comprising a dynamic characteristic of the computer system;

(c) selecting one communication mode from the plurality of communication modes using said associated run-time user parameter and said run-time hardware parameter so as to optimize performance of the computer system, said one communication mode determining how the information is to be distributed from the originating node of said multiple nodes to the predetermined number of other nodes of the multiple nodes, wherein said selecting includes employing said run-time user parameter and said run-time hardware parameter in a predefined decision function to select said one communication mode from said plurality of communication modes, said predefined decision function employing a plurality of predefined relationships, wherein at least some predefined relationships of said plurality of predefined relationships comprise system use relationships which project for each communication mode an anticipated resource loading within the computer system for distribution of said information using said communication mode, said selecting including employing said projections of said at least some predefined relationships within said predefined decision function to select said one communication mode from said plurality of communication modes to minimize said anticipated resource loading within the computer system due to distribution of said information from said originating node to said predetermined number of other nodes of said multiple nodes; and (d) distributing said information from the originating node of said multiple nodes to the predetermined number of other nodes of said multiple nodes using said selected one communication mode; and wherein said anticipated resource loading comprises anticipated system traffic, and wherein said selecting includes employing a predefined traffic relationship within said decision function, said predefined traffic relationship comprising a relationship definitive of projected computer system traffic by performing the particular operation using the selected one communication mode, wherein said selected one communication mode comprises a hypercube mode broadcast, and wherein said predefined traffic relationship comprises:

$$m(N-1)$$

wherein:
m=message length; and
N=number of nodes.

* * * * *